(12) United States Patent
Fleck (10) Patent No.: US 10,331,235 B2
(45) Date of Patent: Jun. 25, 2019

(54) STYLUS TILT DETECTION BASED ON BIDIRECTIONAL COMMUNICATION BETWEEN STYLUS AND STYLUS SENSOR CONTROLLER

(71) Applicant: Wacom Co., Ltd., Saitama (JP)

(72) Inventor: David Charles Fleck, Vancouver, WA (US)

(73) Assignee: Wacom Co., Ltd., Saitama (JP)

( * ) Notice: Subject to any disclaimer, the term of this patent is extended or adjusted under 35 U.S.C. 154(b) by 128 days.

(21) Appl. No.: 15/360,570

(22) Filed: Nov. 23, 2016

(65) Prior Publication Data

US 2018/0143703 A1     May 24, 2018

(51) Int. Cl.
| | | |
|---|---|---|
| *G06F 3/033* | (2013.01) | |
| *G06F 3/0354* | (2013.01) | |
| *G06F 3/0346* | (2013.01) | |
| *G06F 3/038* | (2013.01) | |
| *G06F 3/041* | (2006.01) | |
| *G06F 3/044* | (2006.01) | |
| *G06F 3/046* | (2006.01) | |

(52) U.S. Cl.
CPC .......... *G06F 3/03545* (2013.01); *G06F 3/038* (2013.01); *G06F 3/0346* (2013.01); *G06F 3/0383* (2013.01); *G06F 3/044* (2013.01); *G06F 3/046* (2013.01); *G06F 3/0418* (2013.01); *G06F 2203/04104* (2013.01)

(58) Field of Classification Search
CPC ............................ G06F 3/03545; G06F 3/0383
See application file for complete search history.

(56) References Cited

U.S. PATENT DOCUMENTS

| | | | |
|---|---|---|---|
| 8,638,320 B2 | 1/2014 | Harley et al. | |
| 8,963,889 B2 | 2/2015 | Oda et al. | |
| 2012/0327042 A1* | 12/2012 | Harley ................ | G06F 3/03545 345/179 |
| 2013/0088465 A1 | 4/2013 | Geller et al. | |
| 2014/0043301 A1 | 2/2014 | Katsurahira | |
| 2015/0035769 A1 | 2/2015 | Shahparnia | |
| 2015/0035810 A1* | 2/2015 | Shahparnia ............... | G06F 1/26 345/179 |
| 2015/0070315 A1 | 3/2015 | Oda et al. | |
| 2015/0070316 A1 | 3/2015 | Oda et al. | |
| 2015/0070317 A1 | 3/2015 | Oda et al. | |
| 2015/0338930 A1 | 11/2015 | Hara | |

(Continued)

FOREIGN PATENT DOCUMENTS

| | | |
|---|---|---|
| CN | 105912147 A | 8/2016 |
| EP | 2 662 755 A1 | 11/2013 |

OTHER PUBLICATIONS

Extended European Search Report, dated Feb. 22, 2018, for European Application No. 17200487.1-1216, 13 pages.

*Primary Examiner* — Insa Sadio
(74) *Attorney, Agent, or Firm* — Seed IP Law Group LLP (57) ABSTRACT

Various embodiments provide a system and method that measures tilt of a stylus relative to a surface of a stylus sensor of an electronic device. In one embodiment, the tilt of the stylus is determined by transmitting a position indicating signal and a tilt indicating signal from respective electrodes of the stylus, and determining positions of the electrodes based on the position indicating signal and the tilt indicating signal. The tilt of the stylus is determined based on the positions of the electrodes.

43 Claims, 8 Drawing Sheets

(56) References Cited

U.S. PATENT DOCUMENTS

| | | |
|---|---|---|
| 2016/0162054 A1 | 6/2016 | Oda et al. |
| 2016/0188016 A1 | 6/2016 | Munakata et al. |
| 2016/0246389 A1 | 8/2016 | Munakata et al. |
| 2016/0306447 A1 | 10/2016 | Fleck et al. |

* cited by examiner

STYLUS TILT DETECTION BASED ON BIDIRECTIONAL COMMUNICATION BETWEEN STYLUS AND STYLUS SENSOR CONTROLLER

BACKGROUND

Technical Field

The present disclosure is related to detecting tilt of an active stylus relative to a surface of a stylus sensor of an electronic device, such as a computer, a tablet, or a smartphone.

Description of the Related Art

Traditionally, an active stylus transmits a signal to an electronic device, such as a tablet or mobile phone, and the electronic device determines a location of an active stylus on a surface of an electronic device based on the transmitted signal. For example, the electronic device may sample signals received from the active stylus, and determine the location of the active stylus based on the signal strengths of the sampled signals. Currently, some active styli include various electronic components that facilitate bidirectional communication (i.e., sending and receiving signals) with an electronic device. For example, an electronic device may send a request for data from a stylus, and the stylus may respond by sending the requested data.

BRIEF SUMMARY

With the addition of bidirectional communications to active styli, two or more electrodes may be used to detect or measure tilt of an active stylus relative to a surface of a stylus sensor of an electronic device. The present disclosure is directed to a system and method that measure tilt of a stylus relative to a surface of a stylus sensor of an electronic device, such as a computer, a tablet, or a smartphone.

According to one embodiment, the system includes a stylus and an electronic device.

The electronic device may include a stylus sensor, a sensor controller, a host processor, and a display. The stylus sensor includes a plurality of sensing antennas (i.e., sensor lines), such as loop coil antennas or line conductor antennas. The sensing antennas receive or detect signals from the stylus. The sensor controller controls the operation of the stylus sensor, performs bidirectional communication with the stylus, and communicates with the host processor. The host processor communicates with the sensor controller and executes a variety of applications or functions. The display is configured to display text or graphics. In one embodiment, the host processor and/or display are external to the electronic device.

The stylus includes a power source, an information manager, a data manager, sensors, buttons, a communication module, two electrodes, an electrode switch, and a stylus controller. The power source may be any type of a power source, such as a battery or a parasitic energy conduit, that provides power to the stylus. The information manager includes a memory or cache that stores stylus capability information of the stylus. The data manager manages operational data of the stylus generated by the sensors. The sensors include one or more sensors, such as a stylus tip pressure sensor and a barrel pressure sensor, which generates operational data of the stylus. The communication module is capable of bidirectional communication with the electronic device. The electrodes are positioned at or near a tip of the body. One of the electrodes is used as a primary electrode for communications and coordinate measurement by the stylus sensor, and the other electrode is used when tilt of the stylus is being measured. The electrode switch switches operational modes of the electrodes between a transmission mode and a reception mode, and selects the electrodes to be active (i.e., to transmit/receive signals) or inactive. The stylus controller controls the operation of the communication module and the electrode switch for bidirectional communication with the sensor controller of the electronic device.

According to one embodiment, the method includes the stylus receiving a request for capability information from the electronic device, the stylus transmitting capability information indicating the stylus is capable of tilt detection to the electronic device, the stylus receiving downlink time slot allocations from the electronic device based on the capability information, the stylus transmitting a position indicating signal and a tilt indicating signal from the electrodes to the electronic device during the downlink time slot allocations, the electronic device determining positions of the electrodes based on the position indicating signal and the tilt indicating signal, and the electronic device determining tilt of the stylus based on the positions of the electrodes.

According to another embodiment, the method includes first and second electrodes of the stylus detecting a signal generated by the electronic device, the stylus measuring a strength of the signal detected by the first and second electrodes, and the stylus determining tilt of the stylus based on the strength of the signal detected by the first and second electrodes.

According to another embodiment, the stylus includes one electrode that is positioned at a tip of the stylus, and three electrodes that are positioned proximal to the tip of the stylus and encircle the body of the stylus to surround a central axis of the stylus. By using four electrodes instead of two electrodes, additional measurements may be generated to improve the accuracy of the tilt detection and can also be used to provide axial twist of the stylus. In this embodiment, the method includes the stylus receiving a request for capability information from the electronic device, the stylus transmitting capability information indicating the stylus is capable of tilt detection to the electronic device, the stylus receiving downlink time slot allocations from the electronic device based on the capability information, the stylus transmitting a position indicating signal from the electrode at the tip of the stylus to the electronic device during the downlink time slot allocations, the electronic device determining a position of the electrode at the tip of the stylus, the stylus transmitting tilt indicating signals from the remaining three electrodes to the electronic device during the downlink time slot allocations, the stylus determining positions of the remaining three electrodes using the tilt indicating signals, and the stylus determining tilt of the stylus based on the position of the electrode at the tip of the stylus and the positions of the remaining three electrodes.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description. Thus, the specific details set forth are merely exemplary. Particular implementations may vary from these exemplary details and still be contemplated to be within the scope of the present invention. Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
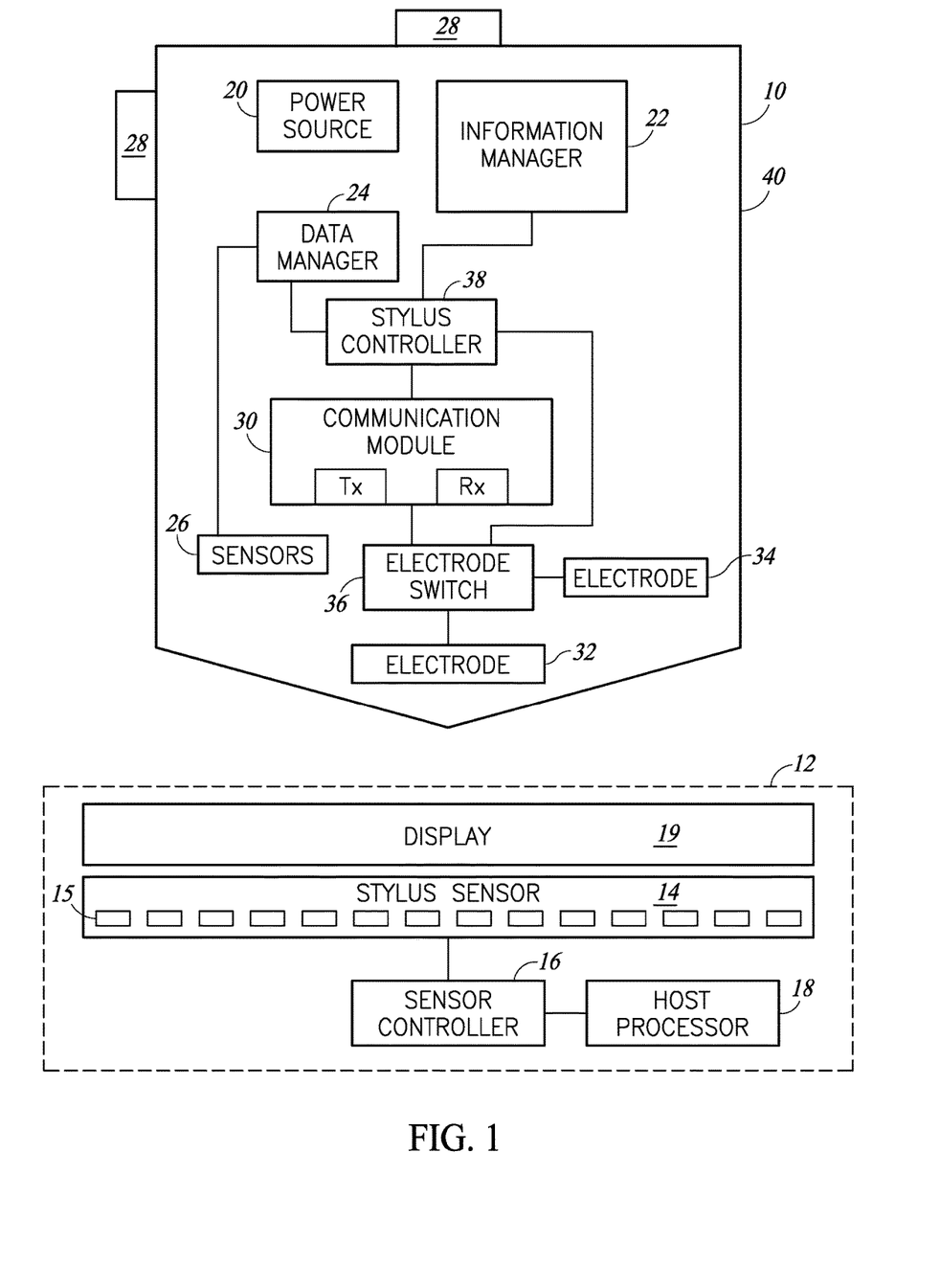
FIG. 1 is a diagram illustrating an example of a system including a stylus and an electronic device according to embodiments disclosed herein.

FIG. 1 is a diagram illustrating an example of a system including a stylus 10 (i.e., active stylus) and an electronic device 12 according to one embodiment.

The electronic device 12 may be any type of device that senses a stylus, such as a personal computer, a tablet computer, and a smartphone. The electronic device 12 includes a stylus sensor 14, a sensor controller 16, a host processor 18, and a display 19. In another embodiment, the host processor 18 and/or the display 19 are external to the electronic device.

The stylus sensor 14 includes a plurality of sensing antennas 15 (i.e., sensor lines), such as loop coil antennas or line conductor antennas. The sensing antennas 15 receive or detect signals from the stylus 10. For example, the antennas 15 may be loop coil antennas configured to receive a magnetic field from the stylus 10, or line conductor antennas configured to receive an electrostatic field from the stylus 10. The signals received or detected by the sensing antennas 15 are often referred to as scan signals. The stylus sensor 14 may include any number of sensing antennas. In one embodiment, the sensing antennas 15 are arranged in a matrix of sensor lines extending in first and second directions that are different from each other. For example, the sensing antennas 15 may be arranged in an array having a plurality of rows and columns. In one embodiment, the stylus sensor 14 is capable of detecting a passive stylus and a finger touch, in addition to the stylus 10.

The sensor controller 16 controls the operation of the stylus sensor 14, performs bidirectional communication with the stylus 10 via a reception/transmission controller, and communicates with the host processor 18.

In one embodiment, the sensor controller 16 processes handwritten input data from the stylus 10 to determine coordinates of a position indicated or pointed to by the stylus 10 on the stylus sensor 14, and forwards the coordinates to the host processor 18. The determination of a position indicated or pointed to by the stylus 10 on the stylus sensor 14 will be discussed in further detail below.

In one embodiment, the sensor controller 16 transmits various commands and other information to the stylus 10. Commands may include a request for the stylus 10 to transmit stylus capability information, a request for the stylus 10 to transmit a tilt indicating signal, a write command to configure capability information for the stylus 10, and a polling command to request the stylus 10 to transmit operational data of the active stylus to the sensor controller 16.

In one embodiment, the sensor controller 16 communicates with the stylus 10 through the sensing antennas 15. In another embodiment, the electronic device 12 includes a communication module similar to communication module 30, which will be discussed in further detail below.

The host processor 18 communicates with the sensor controller 16 and executes a variety of applications or functions. In one embodiment, the host processor 18 receives coordinates from the sensor controller 16 and executes an application or function based on the received coordinates. The sensor controller 16 and the host processor 18 are connected via any suitable interface, such as the USB Human Interface Devices Protocol. In one embodiment, the host processor 18 is a controller or CPU with memory.

The display 19 is configured to display text or graphics. In one embodiment, the display 19 displays text or graphics in response to the stylus 10 being detected by the stylus sensor 14. The display may be located above the stylus sensor 14 as shown in FIG. 1, below the stylus sensor 14, or external to the electronic device 12.

The stylus 10 may be any stylus that is capable of bidirectional communication (i.e., sending and receiving signals). The stylus 10 includes a power source 20, an information manager 22, a data manager 24, sensors 26, buttons 28, a communication module 30, electrodes 32 and 34, an electrode switch 36, and a stylus controller 38. The power source 20, the information manager 22, the data manager 24, sensors 26, the buttons 28, the communication module 30, the electrodes 32 and 34, the electrode switch 36, and the stylus controller 38 are housed by a body 40. In one embodiment, the body 40 has an elongated shape similar to a pen.

The power source 20 may be any type of a power source, such as a battery or a parasitic energy conduit, that provides power to the stylus 10.

The information manager 22 includes a memory or cache that stores stylus capability information of the stylus 10. The stylus capability information includes information indicating that the stylus 10 is capable of tilt detection. The stylus capability information also includes information indicating an operational state of the stylus 10. For example, the stylus capability information may include information regarding predefined capabilities of the stylus and setting information regarding user-adjustable settings of the stylus. In one embodiment, the information manager 22 updates the setting information each time a user changes the stylus setting, such as the stylus color and stylus line width.

The data manager 24 manages operational data of the stylus 10. The operational data indicates an operational state of the stylus 10, such as stylus tip pressure, stylus barrel pressure, stylus orientation (e.g., twist), stylus switch status, and stylus battery level. The operational data is generated by the sensors 26. The sensors 26 may include a stylus tip pressure sensor (e.g., a variable capacitor) configured to sense pressure applied to the stylus tip; a barrel pressure sensor configured to sense pressure applied to the stylus barrel; a 9-axis or lesser-axis IMU (inertial measurement unit) including one or more combinations of 3-axis gyroscopes, 3-axis accelerometers, and 3-axis magnetometers; and a twist sensor configured to sense twist/rotation of the stylus 10.

The buttons 28 allow the user to configure or adjust the stylus 10. For example, a user may use the buttons 28 to update setting information, such as the stylus color and stylus line width. The buttons 28 also allows the user to send instructions or commands to the sensor controller 16. For instance, a user may use the buttons 28 to indicate a right click command to the electronic device 12 similar to a computer mouse. The stylus 10 may include any number of buttons and may be positioned anywhere on the body 40. The buttons 28 may also be replaced with other types of mechanical inputs, such as switches, knobs, etc.

The communication module 30 is capable of bidirectional communication with the electronic device 12. In one embodiment, the communication module 30 includes transmission (TX) and reception (RX) circuitry that communicates with the electronic device 12 through the electrode 32 and/or the electrode 34. The electrodes 32 and 34 are typically used to electromagnetically or electrostatically communicate with the sensor lines 15 of the stylus sensor 14. The TX and RX circuitry are sometimes referred to as a signal generator and a signal receiver, respectively. In the same or another embodiment, the communication module 30 includes a transmitter and a receiver, or a transceiver, specific to a particular communication protocol. The communication module may utilize any one or more types of communication protocols. For example, a protocol based on electromagnetic communication, a protocol based on electrostatic communication, or any RF communication protocol, such as Bluetooth®, may be used. Signals transmitted by the communication module 30 may be code-division-multiplexed, frequency-division-multiplexed, or time-division-multiplexed.

Figure 2:
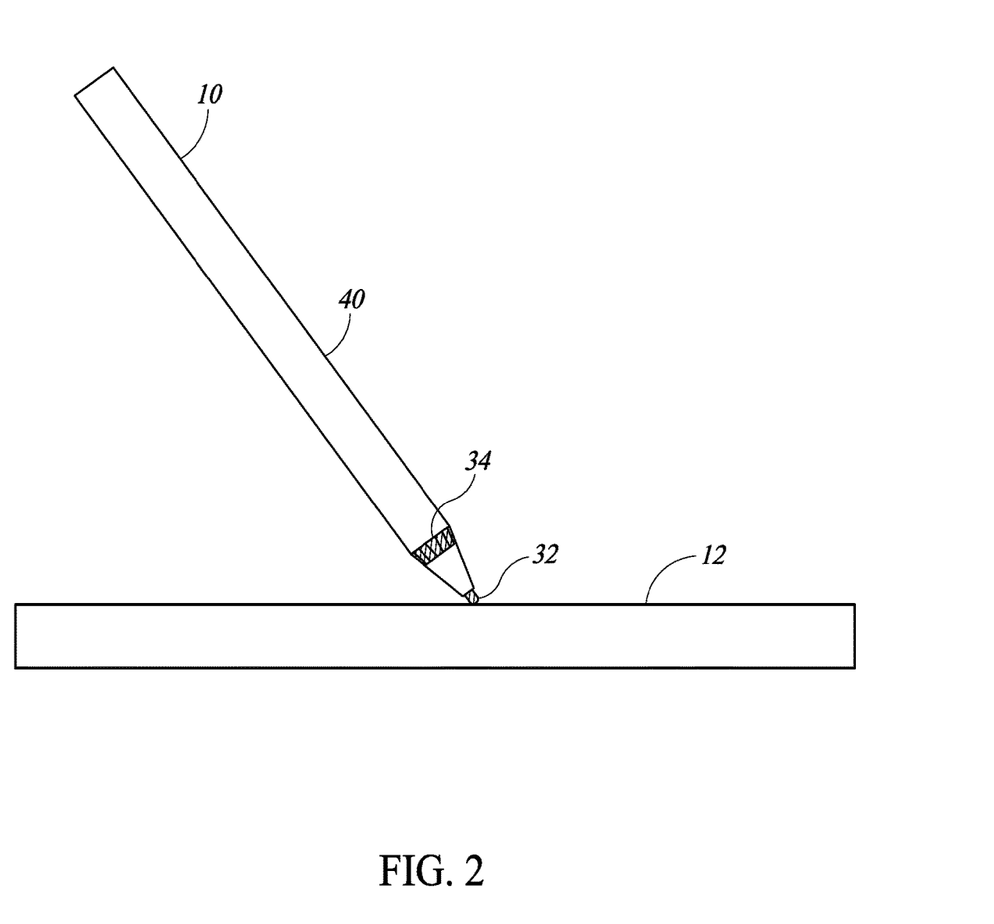
FIG. 2 is a diagram illustrating an example of a stylus including two electrodes according to embodiments disclosed herein.

The electrode 32 and the electrode 34 are positioned at different locations from each other. FIG. 2 is a diagram illustrating an example of the stylus 10 including the electrode 32 and the electrode 34. The electrode 32 is positioned at or near a tip of the body 40. The electrode 34 is proximal to the tip of the body 40 and spaced from the electrode 32. In one embodiment, the electrode 34 is a ring electrode (i.e., the electrode 34 encircles the body 40). In one embodiment, as will be discussed in further detail below, the electrode 32 is used as a primary electrode for communications and coordinate measurement by the sensor controller 16, and the electrode 34 is used when tilt of the stylus 10 is being measured.

The electrode switch 36 switches operational modes of the electrode 32 and the electrode 34 between a transmission mode and a reception mode. For example, the electrode switch 36 may independently set the electrode 32 to transmission mode to transmit a signal to the electronic device 12, set the electrode 34 to transmission mode to transmit a signal to the electronic device 12, set the electrode 32 to reception mode to receive a signal from the electronic device 12, and set the electrode 34 to reception mode to receive a signal from the electronic device 12.

In addition, the electrode switch 36 independently selects the electrode 32, the electrode 34, or both the electrode 32 and the electrode 34 to be active (i.e., to transmit/receive signals). For example, the electrode switch 36 may select the electrode 32 to be active to transmit/receive a signal to/from the electronic device 12, select the electrode 34 to be active to transmit/receive a signal to/from the electronic device 12, and select both the electrode 32 and the electrode 34 to be active to transmit/receive a signal to/from the electronic device 12. Although not shown in FIG. 1, the electrode switch 36 may include one or more switches to selectively set the electrodes 32 and 34 in transmission mode or reception mode, and select the electrodes 32 and 34 to be active.

The stylus controller 38 controls the operation of the communication module 30 and the electrode switch 36 for bidirectional communication with the sensor controller 16 of the electronic device 12. For example, the stylus controller 38 may set, via the electrode switch 36, the electrode 32 to transmission mode and transmit, via the communication module 30 and the electrode 32, stylus capability information and operational data to the sensor controller 16. As previously discussed, stylus capability information may include information regarding capabilities of the stylus and setting information regarding user-adjustable settings of the stylus; and operational data may include data, such as stylus tip pressure data, stylus barrel pressure data, stylus orientation data, stylus switch status, and stylus battery level.

The stylus 10 and the electronic device 12 perform a pairing operation to connect to each other to enable bidirectional communication. The pairing operation begins by the electronic device 12 transmitting a beacon signal for discovery. The beacon signal may be transmitted continuously or periodically. For example, the sensor controller 16 may transmit a beacon signal every 10 milliseconds through the sensing antennas 15. Upon the stylus 10 detecting the beacon signal, the stylus 10 prepares and transmits a response signal to acknowledge the beacon signal (e.g., an ACK signal). For example, the stylus controller 38 may prepare and transmit an ACK signal via the communication module 30 and the electrode 32. Upon the electronic device 12 receiving the response signal from the stylus 10, the electronic device 12 establishes a communication link with the stylus 10 for bidirectional communication.

Figure 3:
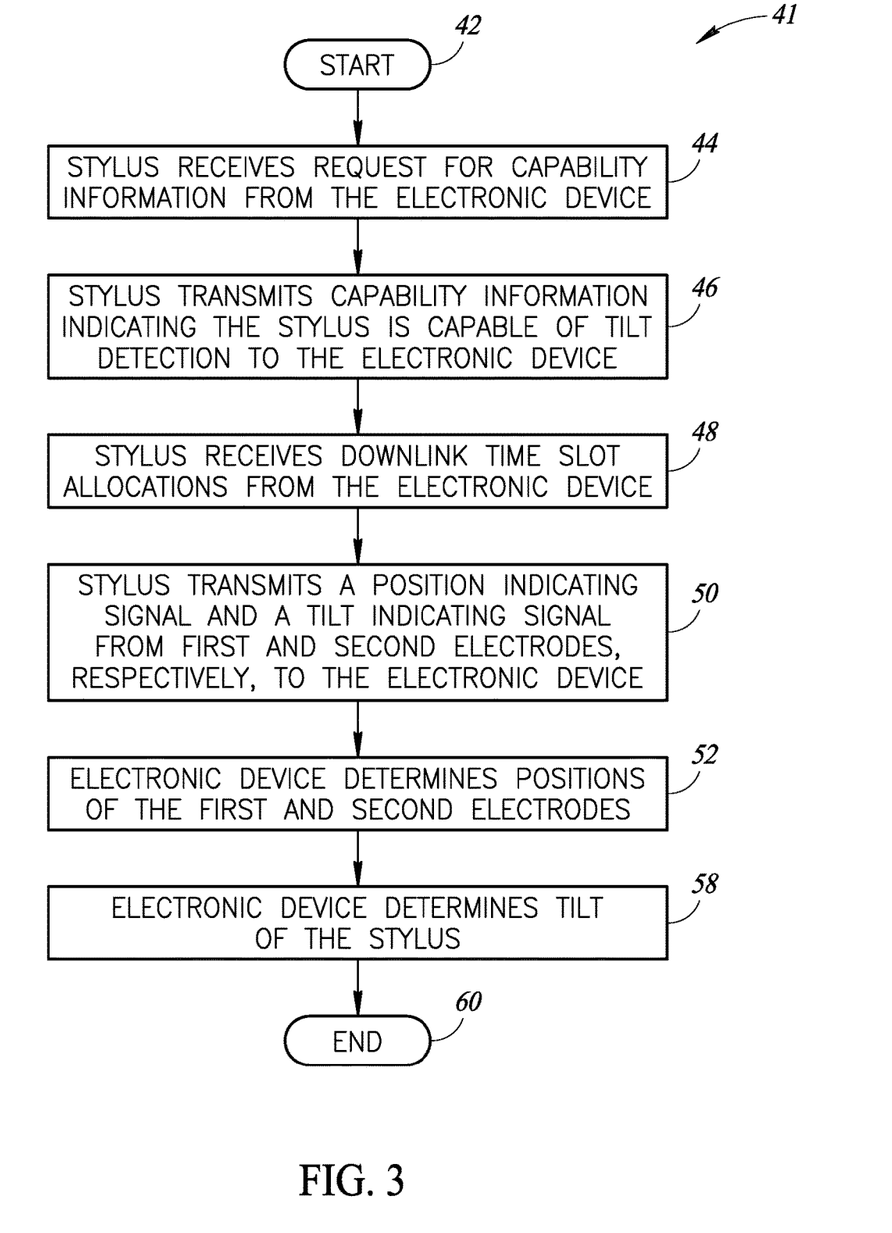
FIG. 3 is a flow diagram illustrating an example of a process for determining tilt of a stylus including two electrodes by an electronic device according to embodiments disclosed herein.
Figure 4:
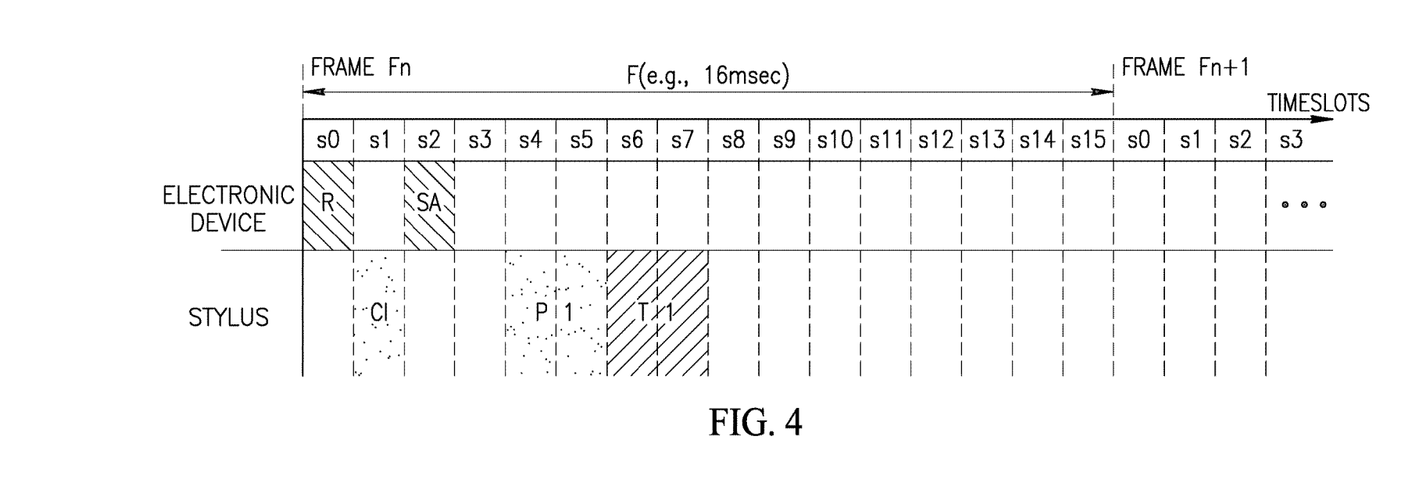
FIG. 4 is a diagram illustrating an example of a frame format for the process of FIG. 3 according to embodiments disclosed herein.

FIG. 3 is a flow diagram illustrating an example of a process 41 for determining tilt of the stylus 10 by the electronic device 12 according to one embodiment. FIG. 4 is a diagram illustrating an example of a frame format for the process 41 according to one embodiment.

In step 42, the process 41 begins. In one embodiment, the process 41 begins subsequent to a communication link between stylus 10 and the electronic device 12 being established by the pairing operation previously described.

In step 44, the stylus 10 receives a request for capability information from the electronic device 12. For example, as shown in FIG. 4, the sensor controller 16 sends a read command (R) in time slot s0 of a frame Fn to request the stylus 10 to transmit capability information to the stylus controller 38. In one embodiment, the request is a vendor-specific command.

In step 46, the stylus 10 transmits capability information indicating the stylus is capable of tilt detection to the electronic device 12. For example, as shown in FIG. 4, the stylus controller 38 retrieves capability information from the information manager 22 and transmits the capability information (CI) in time slot s1 of the frame Fn.

In one embodiment, the electrode 32 is used as a primary electrode for communications, and the request for capability information received in step 44 and the capability information transmitted in step 46 is via the electrode 32.

In an alternative embodiment, step 44 is skipped and step 46 is performed during the pairing operation previously discussed. In particular, step 46 is performed (i.e., the stylus 10 transmits the capability information) in response to the stylus 10 detecting the beacon signal transmitted by the electronic device 12. In one embodiment, the capability information is included in the response signal to acknowledge the beacon signal (e.g., ACK signal). In another embodiment, the capability information is transmitted subsequent to the response signal to acknowledge the beacon signal.

In an alternative embodiment, step 44 and step 46 are skipped and the stylus 10 initiates the process 41 for determining tilt of the stylus 10 by the electronic device 12. In particular, instead of performing steps 44 and 46, the stylus 10 transmits a command that indicates that the stylus 10 has vendor-specific data to send. The process 41 then proceeds to step 48.

In step 48, the stylus 10 receives downlink time slot allocations (SA) from the electronic device 12 (time slot s2). The downlink time slot allocations are to be used to transmit a position indicating signal and a tilt indicating signal, respectively. For example, as shown in FIG. 4, the sensor controller 16 assigns a first downlink time slot allocation (time slots s4 and s5) of the frame Fn for transmitting a position indicating signal (P1) and a second downlink time slot allocation (time slots s6 and s7) of the frame Fn for transmitting a tilt indicating signal (T1). The sensor controller 16 then transmits the first and second downlink time slot allocations to the stylus controller 38. The position indicating signal and the tilt indicating signal will be discussed in further detail below. In one embodiment, the allocation of the downlink time slots is a vendor-specific command.

The electronic device 12 determines the number and length of downlink time slot allocations based on the capability information received from the stylus 10 in step 46. For example, the capability information may indicate that the active stylus 10 includes tilt detection capability that utilizes a 2 millisecond position indicating signal and a 2 millisecond tilt indicating signal. Accordingly, as shown in FIG. 4, the sensor controller 16 assigns two downlink time slot allocations that are each 2 milliseconds long (e.g., a first downlink time slot allocation that includes time slots s4 and s5, and a second downlink time slot allocation that includes time slots s6 and s7) to the stylus 10.

In step 50, the stylus 10 transmits a position indicating signal and a tilt indicating signal from the electrodes 32 and 34, respectively, to the electronic device 12. The position indicating signal and the tilt indicating signal, as will be discussed in further detail below, are used to determine positions of the electrode 32 and the electrode 34, respectively, for tilt detection.

The position indicating signal and the tilt indicating signal are sent using the downlink time slot allocations received in step 48. For example, as shown in FIG. 4, the stylus controller 38 transmits the position indicating signal (P1) during time slots s4 and s5 of the frame Fn and the tilt indicating signal (T1) during time slots s6 and s7 of the frame Fn. The position indicating signal and the tilt indicating signal may be any type of signal transmitted from the electrode 32 and the electrode 34, respectively. For example, a position indicating signal and a tilt indicating signal may be a pilot packet, a data packet (e.g., a data packet including stylus capability information of the stylus 10), a dummy packet, a notification packet, etc. The position indicating signal and the tilt indicating signal transmitted by the stylus 10 are distinguishable from each other based on one or more of (1) the position indicating signal and the tilt indicating signal being transmitted from the stylus 10 at different times (e.g., time-division-multiplexing), (2) the position indicating signal and the tilt indicating signal having different frequencies (e.g., frequency-division-multiplexing), and (3) the position indicating signal and the tilt indicating signal being uniquely coded (e.g., code-division-multiplexing).

In one embodiment, the stylus 10 continuously or periodically transmits a position indicating signal from the electrode 32 that is used for determining a position of stylus 10 on a surface of the stylus sensor 14, and transmits the tilt indicating signal from the electrode 34 in response to receiving a command or request from the electronic device 12.

Figure 5:
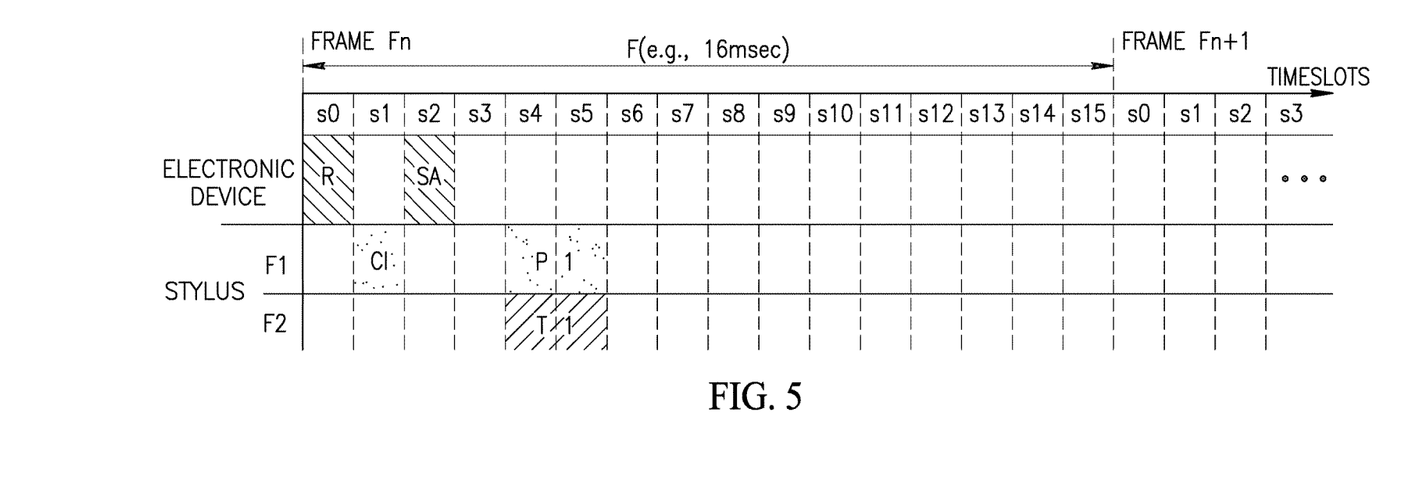
FIG. 5 is a diagram illustrating an example of a frame format for the process of FIG. 3 according to another embodiment disclosed herein.

In another embodiment, the position indicating signal and the tilt indicating signal are simultaneously sent using two different frequencies. FIG. 5 is a diagram illustrating an example of a frame format for the process 41 according to another embodiment. As shown in FIG. 5, the position indicating signal (P1) is transmitted during time slots s4 and s5 of the frame Fn using a first frequency (F1), and the tilt indicating signal (T1) is transmitted during time slots s4 and s5 of the frame Fn using a second frequency (F2) that is different from the first frequency. Accordingly, the number of time slots used for transmitting the position indicating signal and the tilt indicating signal is minimized, and the number of downlink time slot allocations assigned in step 48 is reduced.

Figure 6:
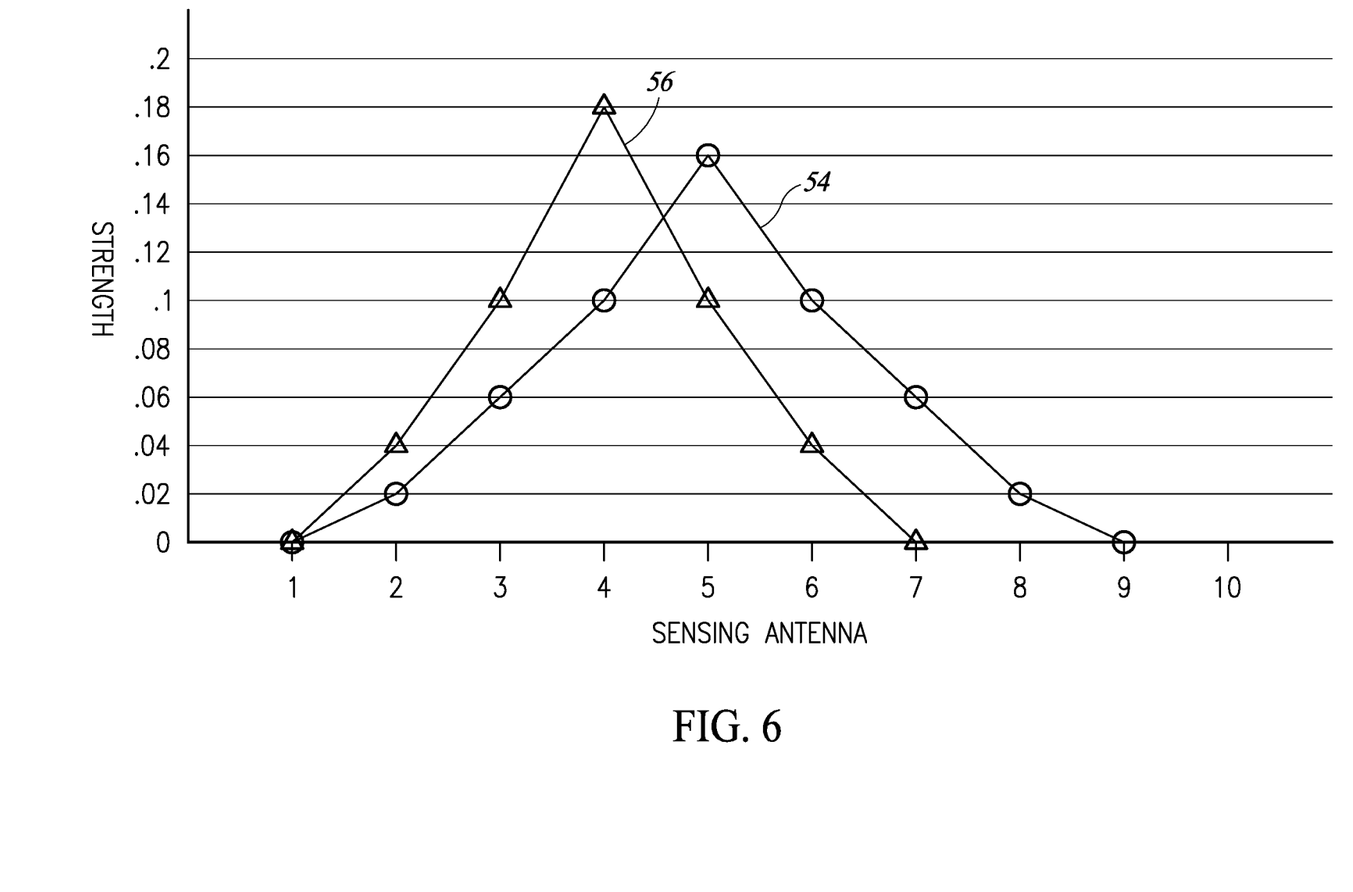
FIG. 6 is a diagram illustrating an example of signal profiles of a position indicating signal and a tilt indicating signal received by sensing antennas of a stylus sensor from first and second electrodes of a stylus according to embodiments disclosed herein.

In step 52, the electronic device 12 determines positions of the electrode 32 and the electrode 34 (i.e., locations or coordinates of the electrodes 32 and 34 on the stylus sensor 14). The positions of the electrode 32 and the electrode 34 are determined based on the position indicating signal and the tilt indicating signal, respectively. In particular, the sensor controller 16 uses the variation of scan signals of the position indicating signal and the tilt indicating signal to interpolate a precise location of the electrodes 32 and 34, respectively. As previously discussed, the scan signals are the signal strengths of the position indicating signal and the tilt indicating signal received or detected by the sensing antennas 15. A location of an electrode is determined to be near an antenna in which the signal strength is the strongest, as signal strength is typically the strongest in an antenna proximate to the stylus 10 and decreases in antennas further away from the stylus 10. FIG. 6 is a diagram illustrating an example of a signal profile of the position indicating signal and the tilt indicating signal received by the sensing antennas 15 of the stylus sensor 14 from the electrode 32 and the electrode 34, respectively, of the stylus 10 according to one embodiment. Ten sensing antennas are shown along the x-axis of FIG. 5, and the strength of the position indicating signal and the tilt indicating signal are shown along the y-axis of FIG. 2B. The strengths of the received signals may be in terms of any type of unit indicative of signal strength, such as voltage, current, tesla, and volts per meter. By interpolating the signal strengths of the signals received by the ten sensing antennas, a signal curve of the position indicating signal 54 and a signal curve of the tilt indicating signal 56 are obtained. The center or maximum of the signal curve 54 and the signal curve 56 indicate the position of the electrode 32 and the electrode 34, respectively. For example, the position of the electrode 32 may be determined to be near or at sensing antenna 6, and the position of the electrode 34 may be determined to be near or at sensing antenna 4. In one embodiment, the sensor controller 16 uses interpolation algorithms that use the strength of two or more antennas nearest to the stylus to improve the resolution of the measured location beyond the antenna spacing.

In step 58, the electronic device 12 determines tilt of the stylus 10. The tilt of the stylus 10 is relative to the surface of the stylus sensor 14. The tilt of the stylus 10 is determined based on the positions of the electrodes 32 and 34. In one embodiment, the sensor controller 16 determines the tilt of the stylus 10 based on the difference in position (i.e., a distance) between the electrodes 32 and 34. In step 60, the process 41 ends.

Figure 7:
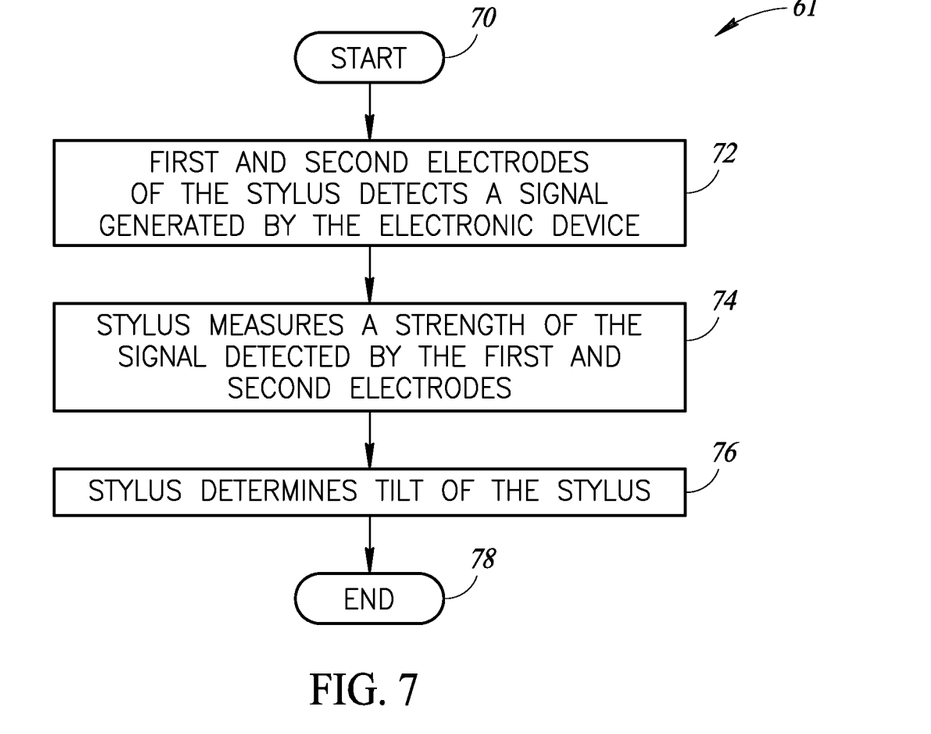
FIG. 7 is a flow diagram illustrating an example of a process for determining tilt of a stylus including two electrodes by a stylus according to embodiments disclosed herein.

FIG. 7 is a flow diagram illustrating an example of a process 61 for determining tilt of the stylus 10 by the stylus 10 according to one embodiment.

In step 70, the process 61 begins. In one embodiment, the process 61 begins subsequent to a communication link between stylus 10 and the electronic device 12 being established by the pairing operation previously described.

In step 72, the electrodes 32 and 34 of the stylus 10 detects a signal generated by the electronic device 12. In one embodiment, the signal is detected (i.e., received) by the electrodes 32 and 34 simultaneously. In another embodiment, the signal is alternately detected (i.e., received) by the electrodes 32 and 34. For example, the electrode 34 may receive the signal generated by the electronic device 12 subsequent to the electrode 32 receiving the signal.

In one embodiment, the signal generated by the electronic device 12 is a signal that is targeted to the stylus 10. Namely, the signal generated by the electronic device 12 is specifically generated to be transmitted to the stylus 10. For example, the signal may be a command or a request for information that is transmitted by the sensor controller 16 to the stylus 10. In another embodiment, the signal generated by the electronic device 12 is a signal that is not targeted to the stylus 10. That is, the signal generated by the electronic device 12 is not specifically intended for the stylus 10. For instance, in an embodiment where the stylus sensor 14 is capable of detecting a passive stylus and a finger touch, the signal may be a signal generated for touch detection, such as a touch scan signal (i.e., a driving signal for the sensing antennas 15). In this embodiment, the electronic device 12 may be unaware that the stylus 10 is calculating the tilt of the stylus 10.

In one embodiment, step 72 is performed when the stylus 10 is idle. For example, step 72 may be performed when the stylus 10 is not transmitting any signals, such as a position indicating signal or a data signal, to the electronic device 12. In an embodiment where the stylus sensor 14 is capable of detecting a passive stylus and a finger touch, step 72 may be performed when the sensor controller 16 is determining a position of a passive stylus or a finger touch and not communicating with the stylus 10.

In step 74, the stylus 10 measures a strength of the signal detected by the electrodes 32 and 34. Namely, the stylus 10 measures the strength of the signal that is detected by the electrode 32, and measures the strength of the signal that is detected by the electrode 32.

In step 76, the stylus 10 determines tilt of the stylus 10. As previously discussed the tilt of the stylus 10 is relative to the surface of the stylus sensor 14. The tilt of the stylus 10 is determined based on the strengths of the signal detected by the electrodes 32 and 34 in step 74. In one embodiment, the stylus controller 38 determines the tilt of the stylus 10 based on a difference in time between when the maximum (i.e., peak) strength of the signal detected by the electrode 32 occurs and when the maximum strength of the signal detected by the electrode 34 occurs. The time difference between the maximums of the signals detected by the electrodes 32 and 34 occurs is proportional to the tilt of the stylus 10. Generally, the larger the difference in time is, the larger the amount of tilt of the stylus 10. For example, if the maximum of the signal detected by the electrode 32 occurs simultaneously with the maximum of the signal detected by the electrode 34, the stylus 10 is positioned vertically. If the maximum of the signal detected by the electrode 34 occurs before the maximum of the signal detected by the electrode 32 the stylus 10 is tilted toward lower numbered antennas 15 of the stylus sensor 14.

In one embodiment, as previously discussed, the signal is detected (i.e., received) by the electrodes 32 and 34 simultaneously. In this embodiment, the time difference between when the maximums of the signals detected by the electrodes 32 and 34 occurs is determined by subtracting the time in which the maximum of the signal detected by the electrode 34 occurs from the time in which the maximum of the signal detected by the electrode 32 occurs, or vice versa (e.g., time difference between maximums=time of maximum of signal detected by electrode 34 occurs−time of maximum of signal detected by electrode 32 occurs).

In another embodiment, as previously discussed, the signal is alternately detected (i.e., received) by the electrodes 32 and 34. In this embodiment, the time difference between when the maximums of the signals detected by the electrodes 32 and 34 occurs is determined by using the start time of the detection performed in step 72. In particular, the time difference between the maximums is determined by subtracting the difference between the time in which the maximum of the signal detected by the electrode 34 occurs and the detection start time from the difference between time in which the maximum of the signal detected by the electrode 32 occurs and the detection start time (e.g., time difference between maximums=(time of maximum of signal detected by electrode 34 occurs−detection start time)−(time of maximum of signal detected by electrode 32 occurs−detection start time)).

In one embodiment, the stylus 10 subsequently transmits the determined tilt of the stylus 10 to the electronic device 12. In step 78, the process 61 ends.

Figure 8A:
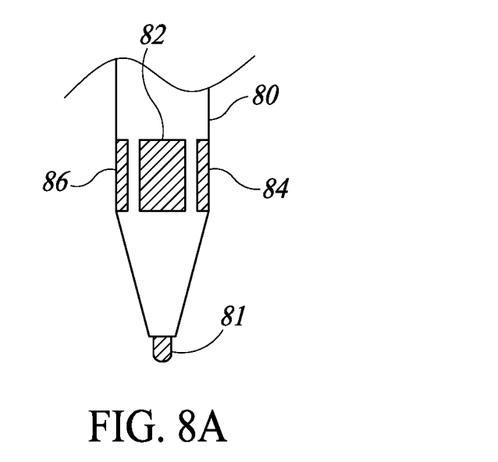
FIG. 8A is a diagram illustrating an example of a first side of a stylus including four electrodes according to embodiments disclosed herein.
Figure 8B:
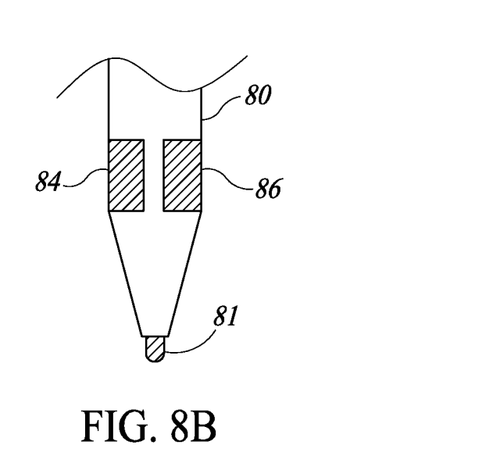
FIG. 8B is a diagram illustrating an example of a second side of the stylus of FIG. 8A according to embodiments disclosed herein.

In another embodiment, the stylus 10 includes four electrodes. FIG. 8A is a diagram illustrating an example of a first side of a stylus 80 including electrodes 81, 82, 84, and 86 according to one embodiment. FIG. 8B is a diagram illustrating an example of a second side, opposite to the first side, of the stylus 80 according to one embodiment. Similar to the electrode 32 of the stylus 10, the electrode 81 is positioned at or near a tip of the stylus 80. The electrodes 82, 84, and 86 are positioned proximal to the tip of the stylus 80 and encircle the body of the stylus 80 to surround a central axis of the stylus 80. In one embodiment, the electrodes 82, 84, and 86 are approximately equally spaced from the tip of the stylus 80, and are approximately equal in size.

Figure 9:
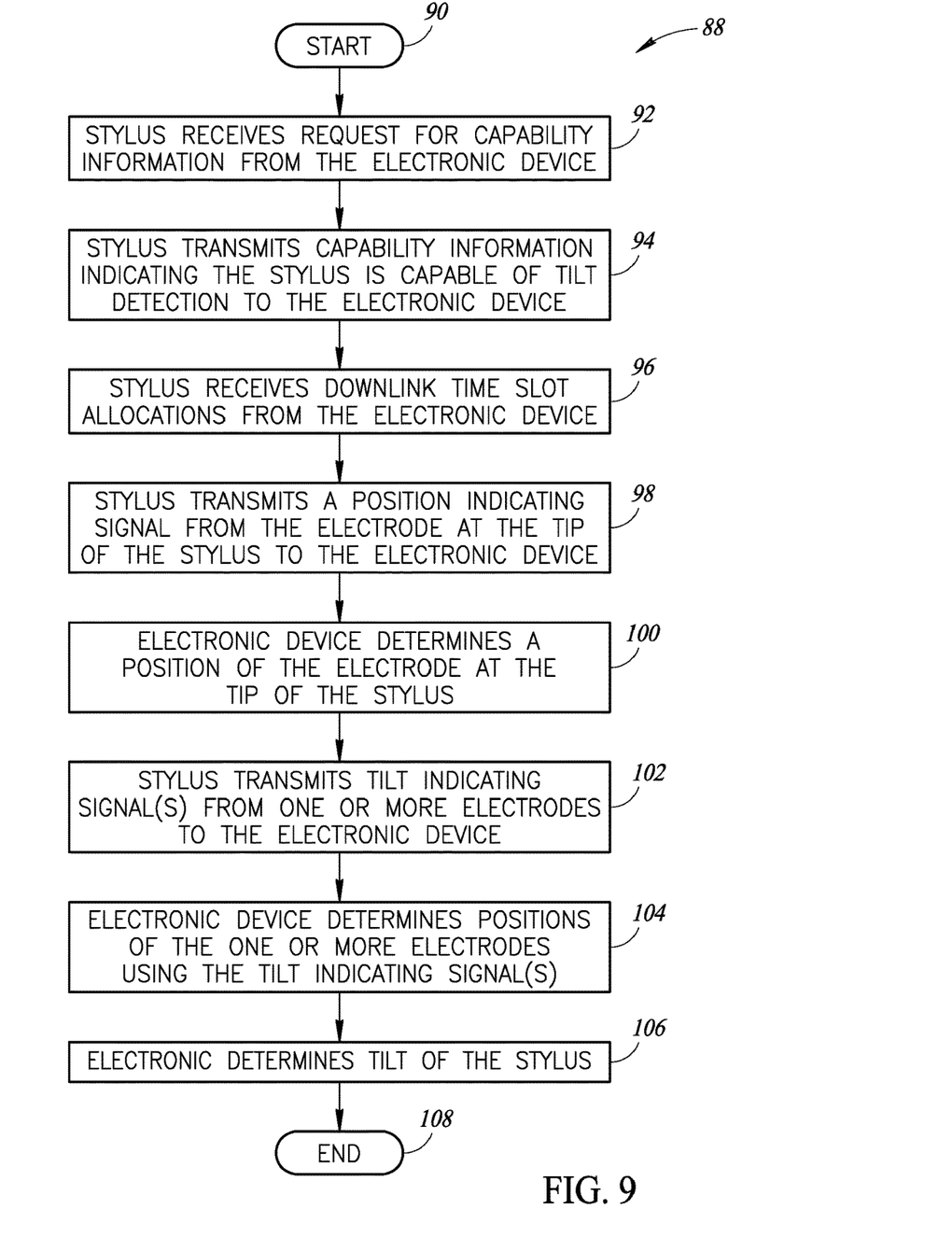
FIG. 9 is a flow diagram illustrating an example of a process for determining tilt of a stylus including four electrodes by an electronic device according to embodiments disclosed herein.
Figure 10:
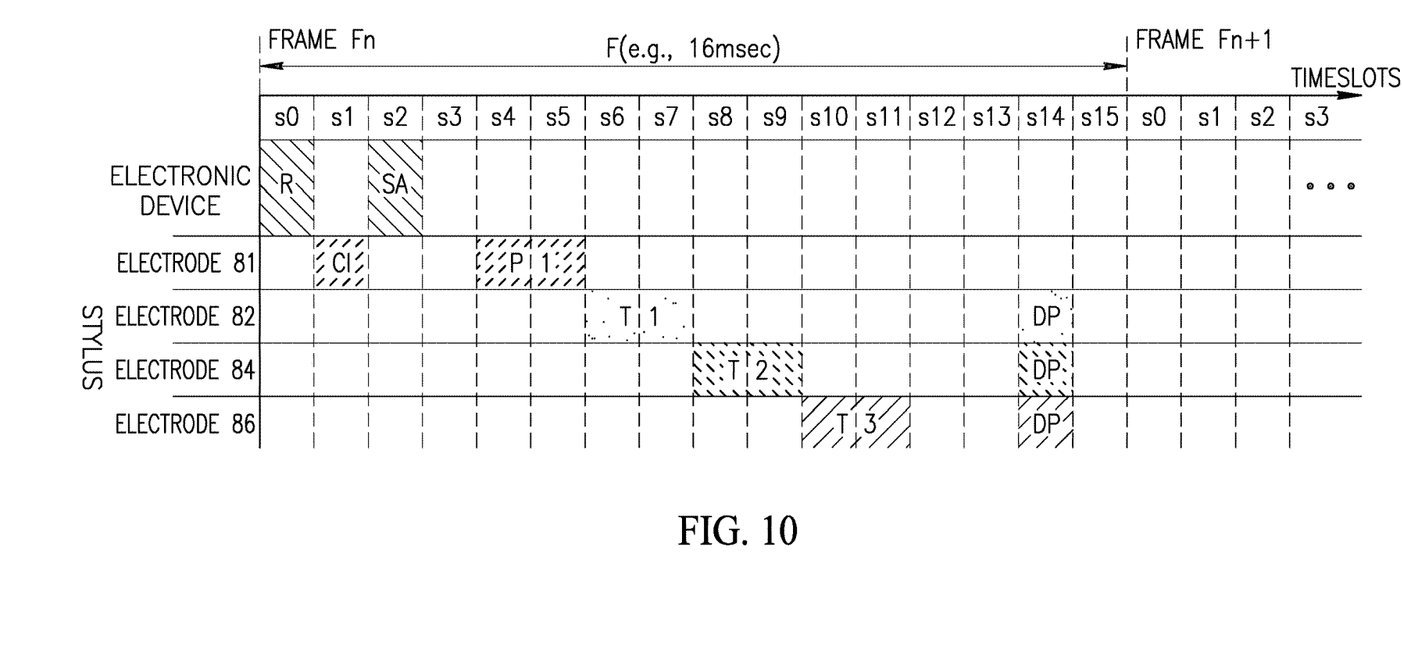
FIG. 10 is a diagram illustrating an example of a frame format for the process of FIG. 9 according to embodiments disclosed herein.

The stylus 80 is similar to the stylus 10, except that the stylus 80 includes four electrodes. The additional electrodes are used to improve tilt detection. By using four electrodes instead of two electrodes, additional measurements may be generated to improve the accuracy of the tilt detection and can also be used to provide axial twist of the stylus. FIG. 9 is a flow diagram illustrating an example of a process 88 for determining tilt of the stylus 80 by the electronic device 12 according to one embodiment. FIG. 10 is a diagram illustrating an example of a frame format for the process 88 according to one embodiment.

Steps 42, 44, 46, and 48 of the process 41 are repeated in steps 90, 92, 94, and 96, respectively, of the process 88. In particular, in step 90, the process 88 begins; in step 92, the stylus 80 receives a request for capability information from the electronic device 12; in step 94, the stylus 80 transmits capability information indicating the stylus is capable of tilt detection to the electronic device 12; and in step 96, the stylus 80 receives downlink time slot allocations from the electronic device 12.

In step 98, the stylus 80 transmits position indicating signals from the electrode at the tip of the stylus 80 (i.e., the electrode 81) to the electronic device 12. The position indicating signal is sent using a downlink time slot allocation received in step 96. For example, as shown in FIG. 10, the stylus controller transmits the position indicating signal (P1) from the electrode 81 during time slots s4 and s5 of the frame Fn. As previously discussed, the position indicating signal may be any type of signal. For example, a position indicating signal may be a pilot packet, a data packet, a dummy packet, a notification packet, etc.

In step 100, the electronic device 12 determines a position of the electrode at the tip of the stylus 80 (i.e., a location or coordinates of the electrode 81 on a surface of the stylus sensor 14). The electronic device 12 determines the position of the electrode 81 based on the position indicating signal received in step 98. As previously discussed, the stylus controller uses the variation of signal strengths of the position indicating signal to interpolate a precise location of the electrode 81. A location of the electrode 81 is determined to be near an antenna in which the signal strength is the strongest.

In step 102, the stylus 80 transmits tilt indicating signals from the electrodes 82, 84, and/or 86 to the electronic device 12. In one embodiment, the stylus 80 transmits a first tilt indicating signal from the electrode 82. In another embodiment, the stylus 80 transmits first and second tilt indicating signals from the electrodes 82 and 84, respectively. In another embodiment, the stylus 80 transmits first, second, and third tilt indicating signals from the electrodes 82, 84, and 86, respectively. As will be discussed in further detail below, the tilt indicating signals are used to determine positions of the electrodes 82, 84, and/or 86 for tilt detection. By using additional tilt indicating signals, additional measurements may be generated to improve the accuracy of the tilt detection and can also be used to determine axial twist of the stylus.

The tilt indicating signals are sent using the downlink time slot allocations received in step 96. For example, as shown in FIG. 10, the stylus controller transmits a first tilt indicating signal (T1) during time slots s6 and s7 of the frame Fn from the electrode 82, a second tilt indicating signal (T2) during time slots s8 and s9 of the frame Fn from the electrode 84, and a third tilt indicating signal (T3) during time slots s10 and s11 of the frame Fn from the electrode 86. As previously discussed, the tilt indicating signal may be any type of signal. For example, a tilt indicating signal may be a pilot packet, a data packet, a dummy packet, a notification packet, etc.

In step 104, the stylus 80 determines positions of the electrodes 82, 84, and/or 86 (i.e., locations or coordinates of the electrodes 32 and 34 on a surface of the stylus sensor 14). Namely, the stylus 80 determines positions of the electrodes that transmitted a tilt indicating signal in step 102. As previously discussed, the stylus controller uses the variation of signal strengths of the position indicating signals to interpolate a precise location of the electrodes 82, 84, and/or 86. A location of an electrode is determined to be near an antenna in which the signal strength is the strongest.

In step 106, the stylus 80 determines tilt of the stylus 80. The tilt of the stylus 80 is determined based on the position of the electrode 81 determined in step 100 and the positions of the electrodes 82, 84, and/or 86 determined in step 104. In one embodiment, the sensor controller 16 determines the tilt of the stylus 80 based on a difference in position (i.e., a distance) between the position of the electrode 81 and each of the electrodes 82, 84, and/or 86 (i.e., a distance between the electrode 81 and the electrode 82, a distance between the electrode 81 and the electrode 84, and/or a distance between the electrode 81 and the electrode 86). By using a plurality of distances to calculate the tilt of the stylus, as opposed to a single distance in step 58 of the process 41, tilt detection is improved. In one embodiment, the stylus 80 also determines axial twist of the stylus 80. Similar to tilt, the twist of the stylus 80 is determined based on the position of the electrode 81 determined in step 100 and the positions of the electrodes 82, 84, and/or 86 determined in step 104. In step 108, the process 88 ends.

It should be noted that although the stylus 80 includes four electrodes, the stylus 80 may include additional electrodes to further improve tilt detection. For example, in one embodiment, the stylus 80 includes five electrodes, and tilt of the stylus 80 is determined based on a difference in position (i.e., a distance) between the electrode 81 and each of the remaining four electrodes.

In one embodiment, multiple electrodes are used to transmit a stronger or boosted signal. A boosted signal is generated by simultaneously driving multiple electrodes to transmit the same signal. For example, as shown in FIG. 10, the electrodes 82, 84, and 86 simultaneously transmit a data packet (DP) in time slot s14 of the frame Fn. By transmitting a stronger signal, the stylus 80 may communicate with the electronic device 12 at greater distances.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An active stylus, comprising:
   an elongate body;
   first and second electrodes arranged at first and second locations different from each other;
   an electrode switch configured to control selective signal transmission from the first electrode and from the second electrode; and
   a stylus controller configured to control the electrode switch to perform:
      in at least one operational setting electrostatically receiving and transmitting signals, via the first electrode, from and to a sensor coupled to and controlled by a sensor controller; and
      in response to receiving a command from the sensor coupled to the sensor controller, electrostatically transmitting a signal from the second electrode to the sensor coupled to the sensor controller,
      wherein the stylus controller is configured to receive from the sensor controller information about timing at which the second electrode transmits the signal to the sensor.

2. The active stylus of claim 1, wherein the stylus controller is configured to perform:
   in response to receiving, at the first electrode, a request for stylus capability information from the sensor controller, transmitting, from the first electrode, a signal including the stylus capability information of the active stylus to the sensor controller.

3. The active stylus of claim 1, further comprising third and fourth electrodes, wherein
   at least four electrodes consisting of the first, second, third, and fourth electrodes are arranged at four different locations;
   the electrode switch is configured to control selective signal transmission from the at least four electrodes; and
   the stylus controller is configured to control the electrode switch to perform:
      in response to receiving, at one or more of the at least four electrodes, a request for stylus capability information from the sensor controller, transmitting, from one or more of the at least four electrodes, signal including the stylus capability information of the active stylus to the sensor controller.

4. The active stylus of claim 3, wherein the first electrode is arranged at or near a tip of the active stylus, and the second, third, and fourth electrodes surround an axis of the active stylus.

5. A method for bidirectional communication between an active stylus and a sensor controller coupled to a sensor, the method comprising:
   electrostatically receiving and transmitting signals, via a first electrode of the active stylus, from and to the sensor coupled to the sensor controller;
   in response to receiving a command from the sensor coupled to the sensor controller, electrostatically transmitting a signal from a second electrode of the active stylus to the sensor coupled to the sensor controller, wherein the second electrode is arranged at a second location different from a first location at which the first electrode is arranged;
   receiving, at the first electrode of the active stylus, a request for stylus capability information from the sensor controller; and
   transmitting, from the first electrode of the active stylus, a signal including the stylus capability information of the active stylus to the sensor controller.

6. The method of claim 5, wherein the first electrode forms a tip of the active stylus and the second electrode is a ring electrode arranged proximal to the tip.

7. The method of claim 5, comprising:
   receiving, at one or more of at least four including the first electrode, the second electrode, a third electrode, and a fourth electrode of the active stylus, a request for stylus capability information from the sensor controller; and
   transmitting, from one or more of the at least four electrodes, a signal including the stylus capability information of the active stylus to the sensor controller.

8. The method of claim 7, wherein the first electrode is arranged at or near a tip of the active stylus, and the second, third, and fourth electrodes surround an axis of the active stylus.

9. A sensor controller to be coupled to a sensor, the sensor controller comprising:
   a reception/transmission controller configured to control electrostatic reception and transmission of signals from and to first and second electrodes arranged at first and second locations of an active stylus; and
   a processor comprising circuitry and configured to:
      determine a position of the active stylus relative to a surface of the sensor based on signals electrostatically received from the active stylus, and
      direct the reception/transmission controller to transmit a command to the active stylus, wherein the command designates that the second electrode of the active stylus be used to electrostatically transmit signals from the active stylus to the sensor, and wherein the command defines information about timing at which the second electrode transmits a signal to the sensor.

10. The sensor controller of claim 9, wherein the processor is configured to determine a tilt angle of the active stylus relative to the surface of the sensor based on signals received from the first electrode and the second electrode.

11. The sensor controller of claim 9, wherein the reception/transmission controller is configured to simultaneously receive signals from the first and second electrodes of the active stylus.

12. The sensor controller of claim 9, wherein the reception/transmission controller is configured to sequentially receive signals from the first and second electrodes of the active stylus.

13. The sensor controller of claim 9, wherein a signal received from the second electrode of the active stylus is distinguishable from a signal received from the first electrode of the active stylus.

14. The sensor controller of claim 9, wherein a signal received from the second electrode and a signal received from the first electrode are code-division-multiplexed or frequency-division-multiplexed.

15. The sensor controller of claim 9, wherein a signal received from the second electrode and a signal received from the first electrode are time-division-multiplexed.

16. The sensor controller of claim 9, wherein the processor is configured to:
   direct the reception/transmission controller to transmit a request for stylus capability information to the active stylus and to receive the stylus capability information including an indication that the active stylus is capable of tilt detection, determine, based on the stylus capability information, a first downlink time slot allocation for use by the active stylus to transmit a position indicating signal, from the first electrode, to the sensor, determine, based on the stylus capability information, a second downlink time slot allocation for use by the active stylus to transmit a tilt indicating signal, from the second electrode, to the sensor, receive the position and tilt indicating signals in the first and second downlink time slots, respectively, and determine a position and a tilt angle of the active stylus relative to the surface of the sensor based on the received position and tilt indicating signals.

17. The sensor controller of claim 9, wherein the processor is configured to:

direct the reception/transmission controller to transmit a request for stylus capability information to the active stylus and to receive the stylus capability information including an indication that the active stylus is capable of tilt detection, determine, based on the stylus capability information, a first downlink time slot allocation for use by the active stylus to transmit a position indicating signal from the first electrode, determine, based on the stylus capability information, at least a second downlink time slot allocation for use by the active stylus to transmit a tilt indicating signal from at least one of the second electrode, a third electrode, and a fourth electrode of the active stylus, and receive the position indicating signal from the first electrode of the active stylus in the first downlink time slot, and receive the tilt indicating signal in the second downlink time slot, and determine a position and a tilt angle of the active stylus relative to the surface of the sensor based on the received position and tilt indicating signals.

18. The sensor controller of claim 9, wherein the processor is configured to:

control the sensor lines of the sensor to transmit signals to the active stylus, and receive from the active stylus a tilt angle of the active stylus relative to the surface of the sensor determined from the signals received at the first and second electrodes of the active stylus.

19. A method for bidirectional communication between an active stylus and a sensor controller coupled to a sensor, the method comprising:

electrostatically receiving and transmitting signals from and to first and second electrodes arranged at first and second locations of the active stylus;

determining a position of the active stylus relative to a surface of the sensor based on signals electrostatically received from the active stylus, and transmitting a command to the active stylus, wherein the command designates that the second electrode of the active stylus be used to electrostatically transmit signal from the active stylus to the sensor, and wherein the command defines information about timing at which the second electrode transmits a signal to the sensor.

20. An active stylus, comprising:

an elongate body;

first and second electrodes arranged at first and second locations different from each other;

an electrode switch configured to control selective signal reception through the first electrode and through the second electrode; and a stylus controller configured to control the electrode switch to perform:

in at least one operational setting electrostatically receiving, by the first and second electrodes, a signal from a sensor coupled to and controlled by a sensor controller;

determining a tilt angle of the active stylus relative to a surface of the sensor based on the signal received by the first and second electrodes; and in response to receiving a command from the sensor coupled to the sensor controller, transmitting information regarding the tilt angle to the sensor coupled to the sensor controller, wherein the tilt angle is determined based on a time difference between a peak signal strength of the signal received by the first electrode and a peak signal strength of the signal received by the second electrode.

21. The active stylus of claim 20, wherein the signal is simultaneously received by the first and second electrodes.

22. A method, comprising:

electrostatically receiving, by first and second electrodes of an active stylus, a signal from a sensor coupled to and controlled by a sensor controller, and the second electrode is arranged at a second location different from a first location at which the first electrode is arranged; and determining a tilt angle of the active stylus relative to a surface of the sensor based on the signal received by the first and second electrodes, wherein the determining of the tilt angle includes determining a time difference between a peak signal strength of the signal received by the first electrode and a peak signal strength of the signal received by the second electrode.

23. The active stylus of claim 1, wherein the command defines the information about timing at which the second electrode transmits the signal to the sensor.

24. The active stylus of claim 2, wherein the stylus capability information includes an indication that the active stylus is capable of tilt detection.

25. The active stylus of claim 1, wherein the electrode switch is configured to switch the first electrode between signal transmission state and signal reception state.

26. The active stylus of claim 1, wherein the electrode switch is configured to control signal transmission from the second electrode independently of signal transmission from the first electrode.

27. The active stylus of claim 1, wherein the electrode switch is configured to control simultaneous signal transmission from the first and second electrodes.

28. The active stylus of claim 1, wherein a signal transmitted from the second electrode and a signal transmitted from the first electrode are distinguishable from each other.

29. The active stylus of claim 1, wherein a signal transmitted from the second electrode and a signal transmitted from the first electrode are code-division-multiplexed or frequency-division-multiplexed.

30. The active stylus of claim 1, wherein a signal transmitted from the second electrode and a signal transmitted from the first electrode are time-division-multiplexed.

31. The active stylus of claim 1, wherein the first and second locations of the first and second electrodes differ along an axis of the active stylus.

32. The active stylus of claim 31, wherein the first location is at or near a tip of the active stylus and the second location is proximal to the first location along the axis of the active stylus.

33. The active stylus of claim 32, wherein the first electrode forms the tip of the active stylus and the second electrode is a ring electrode arranged proximal to the tip.

34. The active stylus of claim 1, wherein the first and second locations of the first and second electrodes are both at or near a tip of the active stylus.

35. The active stylus of claim 1, wherein the first electrode is arranged along an axis of the active stylus and the second electrode consists of plural electrode pieces that surround the axis of the active stylus.

36. The active stylus of claim 35, wherein the electrode switch is configured to control selective signal transmission from the plural electrode pieces, respectively.

37. The active stylus of claim 35, wherein the electrode switch is configured to control sequential signal transmission from the plural electrodes pieces.

38. The active stylus of claim 35, wherein the electrode switch is configured to control simultaneous signal transmission from the plural electrode pieces.

39. The method of 21, wherein the stylus capability information includes an indication that the active stylus is capable of tilt detection.

40. A method for bidirectional communication between an active stylus and a sensor controller coupled to a sensor, the method comprising:

electrostatically receiving and transmitting signals, via a first electrode of the active stylus, from and to the sensor coupled to the sensor controller; and in response to receiving a command from the sensor coupled to the sensor controller, electrostatically transmitting a signal from a second electrode of the active stylus to the sensor coupled to the sensor controller, wherein, the second electrode is arranged at a second location different from a first location at which the first electrode is arranged, the command defines information about timing at which the second electrode transmits the signal to the sensor, and the signal transmitted from the second electrode and a signal transmitted from the first electrode are distinguishable from each other.

41. The active stylus of claim 40, wherein the signal from the second electrode is transmitted with the signal transmitted from the first electrode overlappingly in time.

42. The active stylus of claim 41, wherein the signal transmitted from the second electrode and the signal transmitted from the first electrode are code-division-multiplexed or frequency-division-multiplexed.

43. The active stylus of claim 40, wherein the signal transmitted from the second electrode and the signal transmitted from the first electrode are time-division-multiplexed.

* * * * *

UNITED STATES PATENT AND TRADEMARK OFFICE
CERTIFICATE OF CORRECTION

PATENT NO. : 10,331,235 B2
APPLICATION NO. : 15/360570
DATED : June 25, 2019
INVENTOR(S) : David Charles Fleck Page 1 of 1

It is certified that error appears in the above-identified patent and that said Letters Patent is hereby corrected as shown below:

In the Claims

Column 17, Claim 39, Line 19:
"The method of 21, wherein" should be --The method of claim 5, wherein--

Signed and Sealed this
Tenth Day of March, 2020

Andrei Iancu
*Director of the United States Patent and Trademark Office*